(12) United States Patent
Sigillito

(10) Patent No.: US 7,978,093 B2
(45) Date of Patent: Jul. 12, 2011

(54) COMPARATIVE TIRE ANIMATION

(75) Inventor: Michael Sigillito, Hendersonville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 413 days.

(21) Appl. No.: 12/237,908

(22) Filed: Sep. 25, 2008

(65) Prior Publication Data

US 2009/0121891 A1    May 14, 2009

Related U.S. Application Data

(60) Provisional application No. 60/986,676, filed on Nov. 9, 2007.

(51) Int. Cl.
*G08B 7/00* (2006.01)

(52) U.S. Cl. ...... 340/691.6; 73/146; 73/146.2; 340/442; 701/29; 702/182

(58) Field of Classification Search ............ 340/442, 340/447, 691.6, 438, 445; 73/118.1, 146, 73/146.5, 146.2; 702/182; 701/1, 29, 82
See application file for complete search history.

(56) References Cited

U.S. PATENT DOCUMENTS

| | | | |
|---|---|---|---|
| 5,245,867 A | 9/1993 | Sube et al. | |
| 6,034,676 A | 3/2000 | Egan et al. | |
| 6,134,957 A | 10/2000 | Fricke et al. | |
| 6,155,110 A | 12/2000 | Lightner et al. | |
| 6,192,745 B1 | 2/2001 | Tang et al. | |
| 6,199,026 B1* | 3/2001 | Shiraishi et al. | 702/140 |
| 6,219,143 B1 | 4/2001 | Lindsay et al. | |
| 6,340,930 B1 | 1/2002 | Lin | |
| 6,448,891 B2 | 9/2002 | Barnett | |
| 6,612,925 B1 | 9/2003 | Forsberg | |
| 6,733,383 B2 | 5/2004 | Busse et al. | |
| 6,791,695 B2 | 9/2004 | Lindsay et al. | |
| 6,925,865 B2 | 8/2005 | Oku | |
| 7,032,436 B2* | 4/2006 | Yokota et al. | 73/105 |
| 7,159,454 B2 | 1/2007 | Tatraux-Paro et al. | |
| 7,228,732 B2 | 6/2007 | Turner et al. | |
| 7,245,208 B2 | 7/2007 | Watabe | |
| 7,299,693 B2 | 11/2007 | Byrne | |
| 7,299,694 B2 | 11/2007 | Byrne | |
| 7,308,390 B2 | 12/2007 | Shiraishi | |

(Continued)

FOREIGN PATENT DOCUMENTS

JP    2002206992    7/2002

(Continued)

OTHER PUBLICATIONS

Jong Oh Park, International Preliminary Report on Patentability and Written Opinion of the International Searching Authority from corresponding PCT application PCT/US08/11186, May 20, 2010, 5 pages, Korean Intellectual Property Office, Seonsa-ro, Seo-gu, Daejeon, Korea.

*Primary Examiner* — Brent Swarthout

(57) ABSTRACT

In the specification and figures a method of displaying comparative tire data is described and shown, wherein a vehicle with a particular set of tires is driven through a test course, vehicle data is recorded, the vehicle is driven through the test course with a different set of tires, the recorded data is processed, the processed data is transformed into an animation, and the animation is displayed.

18 Claims, 2 Drawing Sheets

U.S. PATENT DOCUMENTS

| | | |
|---|---|---|
| 2002/0024432 A1* | 2/2002 | Lin et al. .................. 340/442 |
| 2004/0064219 A1* | 4/2004 | Mancosu et al. ................ 701/1 |
| 2004/0068397 A1 | 4/2004 | Ohsawa |
| 2005/0150283 A1 | 7/2005 | Shick et al. |
| 2006/0114107 A1 | 6/2006 | Kim et al. |
| 2006/0129908 A1 | 6/2006 | Markel |
| 2006/0130567 A1 | 6/2006 | Ben-David |
| 2006/0282208 A1* | 12/2006 | Byrne ............................ 701/82 |
| 2007/0038422 A1 | 2/2007 | Wang et al. |
| 2007/0074565 A1 | 4/2007 | Jayakumar et al. |
| 2007/0247294 A1 | 10/2007 | Baader et al. |
| 2007/0260438 A1 | 11/2007 | Langer et al. |
| 2007/0287135 A1* | 12/2007 | Jeon et al. ...................... 434/29 |

FOREIGN PATENT DOCUMENTS

KR   10-0665270   1/2007

* cited by examiner

COMPARATIVE TIRE ANIMATION

CROSS-REFERENCE

This invention claims priority from U.S. Provisional Patent Application Ser. No. 60/986,676, filed Nov. 9, 2007, incorporated herein by reference.

FIELD OF INVENTION

The present application relates to a method for displaying comparative tire data. More particularly, the application relates to a method of testing a variety of tires in a variety of test conditions and using the data gathered to display the test results through the use of animation software.

SUMMARY

In one embodiment, objective measurements of a vehicle's performance using a particular set of tires are taken during testing on a track. This process may be repeated for as many sets of tires as are desired to be compared. The measurements are then transferred to animation software. The animation software is used to create an animation which simultaneously displays the vehicle driving along the test course with each set of tires. The animation may be displayed using various means such as on a website, on a video monitor at retail tire and automotive stores, on a video monitor during sales presentations to vehicle manufacturers, on a video monitor at racing events, on a video monitor at tire or automotive trade shows, or on a video monitor at driver training events. The animation may also be used by tire engineers to determine whether particular tires should be modified in order to obtain better performance characteristics when being driven on a particular vehicle, on a particular test course, or under particular environmental conditions.

BRIEF DESCRIPTION OF DRAWINGS

In the accompanying drawings, a block diagram and an exemplary screen display are illustrated that, together with the detailed description provided below, describe exemplary embodiments of the claimed invention and are not intended to be limiting. Like elements are identified with the same reference numerals. The drawings are not to scale and the proportion of certain elements may be exaggerated for the purpose of illustration.

DETAILED DESCRIPTION

Figure 1:
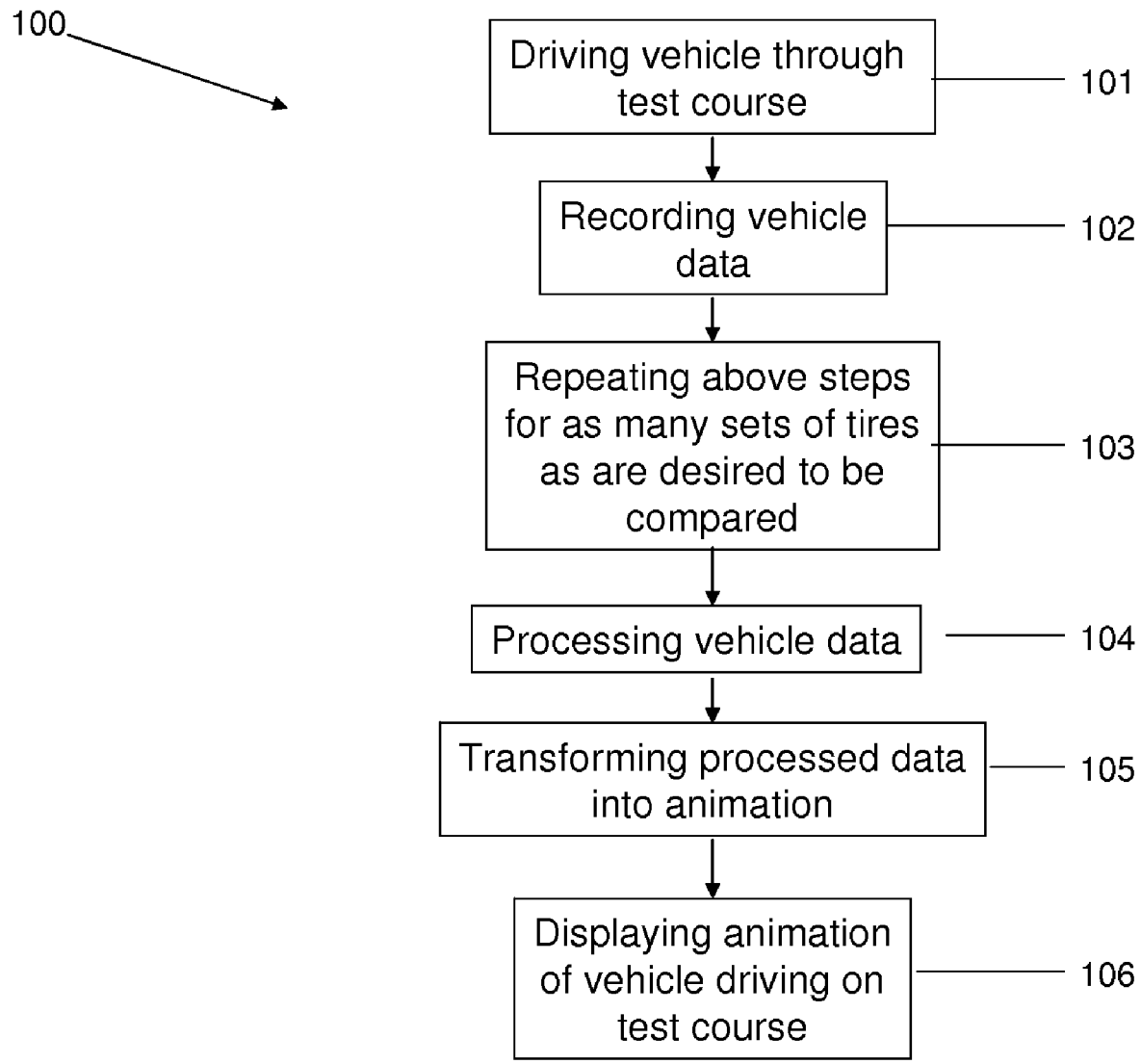
FIG. 1 illustrates a block diagram of method steps for displaying comparative tire data.

FIG. 1 illustrates a method 100 for displaying comparative tire data. A vehicle mounted with a particular set of tires is driven through a test course 101. The test course may be a straight track, an oval, a road course, a skidpad, an autocross, or any other suitable test course or combination of test courses. In addition, the test course may be dry, wet, snow covered, ice covered, low temperature, average temperature, high temperature and combinations thereof. Low temperature is herein defined as below about 32 degrees Fahrenheit. Average temperature is herein defined as between about 33 degrees Fahrenheit and about 80 degrees Fahrenheit. High temperature is herein defined as above about 81 degrees Fahrenheit. Various vehicle maneuvers that are known to one skilled in the art may be performed on the test course. For example, cornering, acceleration, braking, and transitions from one maneuver to another maneuver.

Data regarding the vehicle's performance is recorded 102. There are many types of data that may be recorded and many ways of measuring the data that are known to one skilled in the art. For example, vehicle pitch and roll may be measured using ride height sensors placed at various locations on the vehicle. In addition, vehicle yaw rate may be measured using a gyro placed on the vehicle. Steering wheel angle may be measured using a rotary potentiometer or through a vehicle data port such as a CANbus. Ride quality may be measured using longitudinal, lateral, and vertical accelerometers placed at various vehicle locations. Noise may be measured using a decibel meter placed inside the vehicle. Vehicle position may be measured using a GPS antenna mounted on the vehicle. The GPS antenna and gyro may be used in combination to calculate body slip angle by recording the change in GPS coordinates and the change in attitude of the vehicle as it drives through the test course. The time that it takes for the vehicle to drive through the test course, or any segment of the test course, may also be measured using any suitable timing device. The various data may be recorded on a data recorder placed on the vehicle or transmitted to a remote location for storage. In addition, a camera may be used to take images of the vehicle. The images may be transformed into a computer vehicle model using modeling software known to one skilled in the art. The vehicle image model may then be used by an animation software program to provide a vehicle animation.

The above steps of driving the vehicle through a test course 101 and recording vehicle data 102 may be repeated for as many different types of tires as are desired to be compared 103.

The vehicle data is then processed using suitable software 104. For example, the data may be processed using Microsoft Excel or MATLAB/Simulink, which is available from The MathWorks Inc., or any other suitable data processing software program known to one skilled in the art. The processing software is used to transform the gathered data into a text file that is readable by an animation software program. For example, the data may be arranged in columns corresponding to the three dimensional position and rotation of the vehicle as it drives through the test course. The processed data may be stored in any suitable storage medium know to one skilled in the art. For example, the animation may be stored on a computer hard drive, a server, a CD-ROM, or DVD-ROM.

Figure 2:
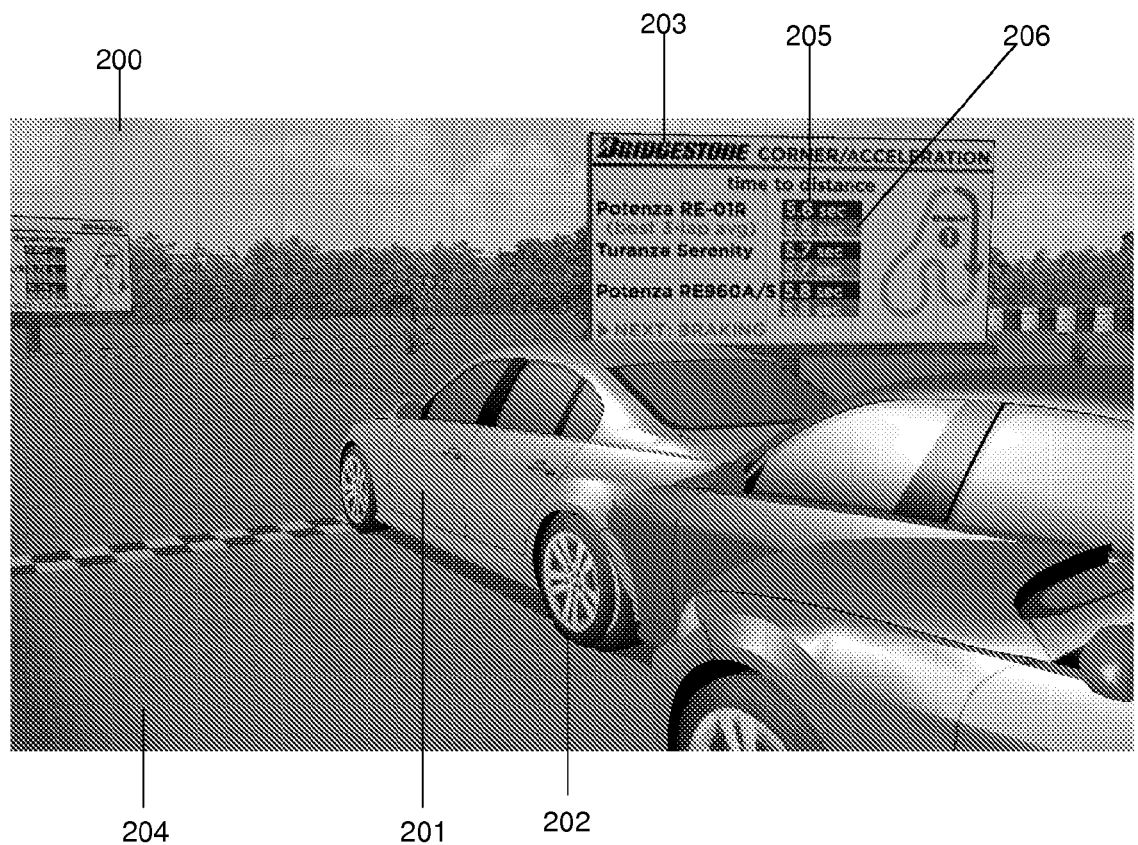
FIG. 2 illustrates a diagram of an exemplary screen display of a comparative tire animation.

The processed data is then transformed into an animation of the vehicle driving through the test course using vehicle animation software known to one skilled in the art 105. For example, CarSim animation software, available from Mechanical Simulation Corporation, may be used to provide the animation. The animation may depict the vehicle driving through the test course alone. The animation may also simultaneously depict the vehicle driving through the test course with each set of tires that are desired to be compared. In addition, the animation may depict each vehicle driving through individual segments of the test course. For example, the animation may depict the vehicle driving through the cornering segment, the acceleration segment, the braking segment, and transitions from one maneuver to another maneuver. After each segment of the course, the animation may display a comparison of how each set of tires performed (FIG. 2). A voiceover may also be used to explain each segment of the test course and to compare the performance of the vehicle using each set of tires. The animation may be stored in any suitable storage medium know to one skilled in the art. For example, the animation may be stored on a computer hard drive, a server, a CD-ROM, or DVD-ROM.

The animation is then displayed 106. The animation may be displayed using various means such as on a website, on a video monitor at retail tire and automotive stores, on a video monitor during sales presentations to vehicle manufacturers, on a video monitor at racing events, on a video monitor at tire or automotive trade shows, or on a video monitor at driver training events.

The animation may also be used by tire engineers to determine whether particular tires should be modified in order to obtain better performance characteristics when being driven on a particular vehicle, on a particular test course, or under particular environmental conditions.

FIG. 2 illustrates a diagram of an exemplary screen display 200 for a comparative tire simulation. An image of the same vehicle 201 may be displayed for each set of tires 202. A billboard 203, or any other suitable display, may be used to display the vehicle performance on the test course 204. For example, a depiction of a car dashboard and/or other graphic charts may be used as well. The billboard in FIG. 2 illustrates each tire's performance on a corner/acceleration segment of the test course 204. The display may list each tire's performance on a particular lap 205 and may also display an average for multiple laps 206.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's claimed invention.

The invention claimed is:

1. A method of displaying comparative tire data, comprising:
   driving a vehicle mounted with a particular set of tires through a test course;
   recording vehicle data;
   repeating the above steps for as many sets of tires as are desired to be compared;
   processing said vehicle data;
   transforming said processed data into an animation; and
   displaying said animation of said processed data, wherein said animation simultaneously depicts said vehicle driving through said test course with each set of tires tested.

2. The method of claim 1, wherein said test course includes a test course selected from the group comprising a straight track, an oval, a road course, a skidpad, an autocross, and combinations thereof.

3. The method of claim 2, wherein said driving takes place in specific environmental conditions, wherein said specific environmental conditions are selected from the group comprising dry, wet, snow, ice, low temperature, average temperature, high temperature and combinations thereof.

4. The method of claim 1, wherein said vehicle data is selected from the group comprising vehicle pitch, vehicle roll, vehicle yaw rate, steering wheel angle, ride quality, noise, vehicle position, body slip angle, time to drive through course segment, time to drive through complete course, and combinations thereof.

5. The method of claim 4, wherein said vehicle data is recorded using a data recorder attached to said vehicle.

6. The method of claim 4, wherein said vehicle data is transmitted to a remote location.

7. The method of claim 1, wherein said vehicle data includes images of said vehicle.

8. The method of claim 1, wherein said step of processing said vehicle data comprises arranging said vehicle data in columns corresponding to the three dimensional position and rotation of said vehicle as it drives through said test course.

9. The method of claim 1, wherein said animation depicts said vehicle driving through said test course alone.

10. The method of claim 1, wherein said animation depicts said vehicle driving through a particular segment of said test course.

11. The method of claim 10, wherein said particular segment of said test course is selected from the group comprising a cornering segment, an acceleration segment, or a braking segment.

12. The method of claim 1, wherein said animation is accompanied by a voiceover explaining each segment of said test course.

13. The method of claim 1, wherein said animation is accompanied by a voiceover comparing the performance of each set of tires tested.

14. The method of claim 1, wherein said step of displaying said animation comprises displaying said animation on a website.

15. The method of claim 1, wherein said step of displaying said animation comprises displaying said animation on a video monitor.

16. The method of claim 1, further including the step of using said animation to determine whether a particular tire design should be modified.

17. A method of displaying comparative tire data, comprising:
   driving a vehicle mounted with a particular set of tires through a test course;
   recording vehicle data;
   repeating the above steps for as many sets of tires as are desired to be compared;
   processing said vehicle data;
   transforming said processed data into an animation of said vehicle simultaneously driving through said test course with each set of tires tested; and
   displaying on a website said animation of said vehicle driving on said test course.

18. A method of displaying comparative tire data, comprising:
   driving a vehicle mounted with a particular set of tires through a test course;
   recording vehicle data;

repeating the above steps for as many sets of tires as are desired to be compared;
processing said vehicle data;
transforming said processed data into an animation, wherein said animation simultaneously depicts said vehicle driving through said test course with each set of tires tested;

displaying said animation of said vehicle driving on said test course; and
using said animation to determine whether a particular tire design should be modified.

* * * * *